Jan. 19, 1932.    L. E. CADWELL ET AL    1,841,400
TRACTOR WHEEL TRACTION CHAIN
Filed March 13, 1931
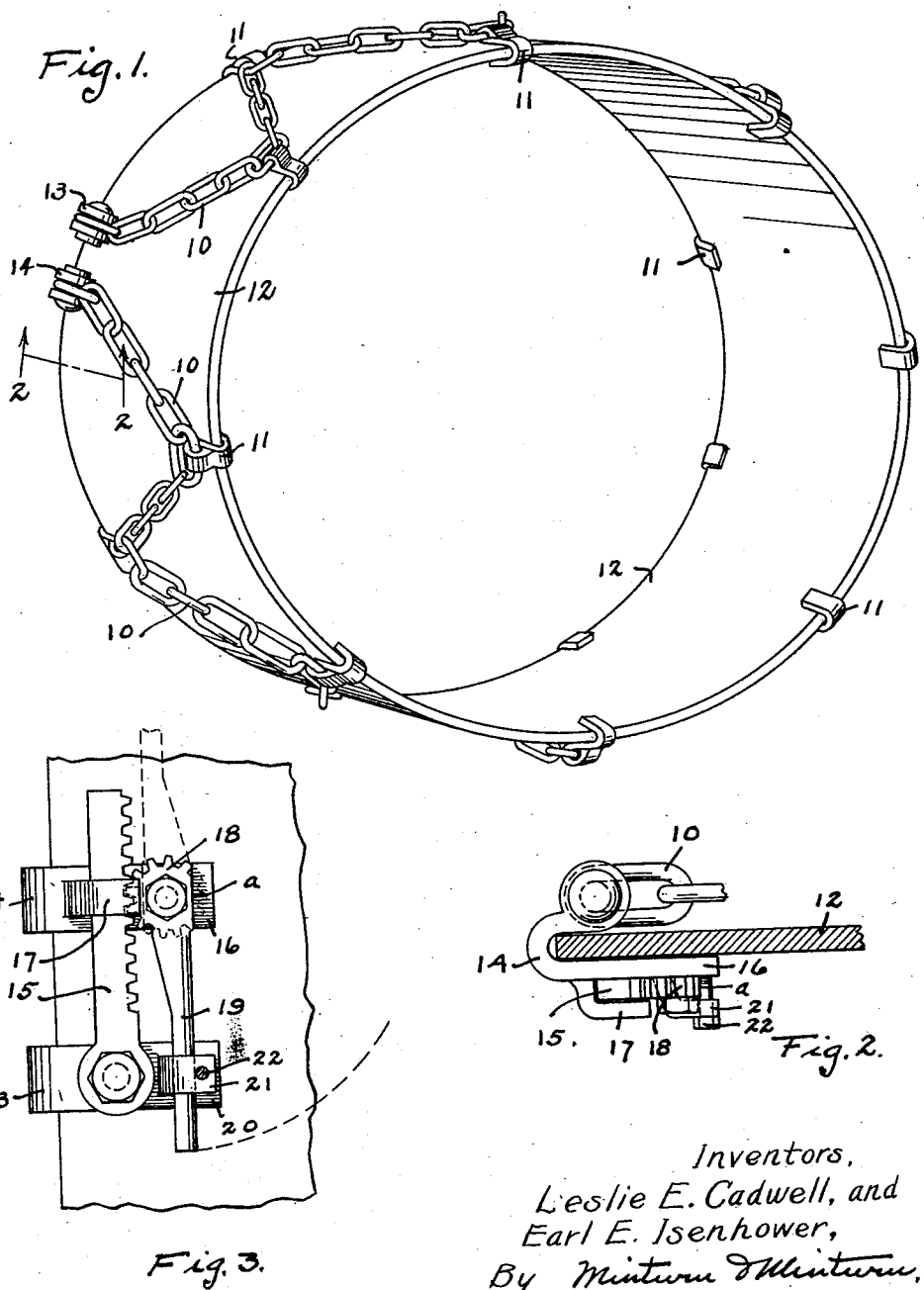
Inventors,
Leslie E. Cadwell, and
Earl E. Isenhower,
By Minturn & Minturn,
Attorneys.

Patented Jan. 19, 1932

1,841,400

UNITED STATES PATENT OFFICE

LESLIE E. CALWELL AND EARL E. ISENHOWER, OF INDIANAPOLIS, INDIANA

TRACTOR WHEEL TRACTION CHAIN

Application filed March 13, 1931. Serial No. 522,313.

This invention relates to the art of tractor drive wheels and particularly to detachable means for increasing the traction of the wheels.

A primary purpose of the invention is to provide a removable structure adapted to be applied to a smooth tread wheel to prevent slippage of the wheel in driving. Heretofore, cleats or lugs of some type have been attached, usually permanently, to the tread of the drive wheel. Such means seriously damage improved surface roads and many districts prohibit their use on the roads. To remove and again attach such cleats or lugs to the usual tractor wheel which may be as large as seven or eight feet in diameter and have a tread two feet wide merely to cross a road is an operation requiring about a day. Our invention eliminates this trouble in that the structure we provide may be readily removed and replaced within a matter of minutes.

A further important object resides in the provision of a removable traction device which has a continuous road contacting line whereby the wheel may roll evenly without up and down travel as has been the usual operation where spaced lugs or cleats were employed.

Another important object resides in the provision of the particular means for securing the device to the wheel which permits the tightening of the device about the wheel to prevent movement thereon and which permits its easy removal.

These and other objects will become apparent in the following description of the invention as illustrated in one particular form in the accompanying drawings, in which Fig. 1 is a perspective view of a rim of a wheel with the invention applied thereto;

Fig. 2, a section on the line 2—2 in Fig. 1; and

Fig. 3, a plan view of the securing mechanism.

Like characters of reference indicate like parts in the several views in the drawings.

We provide a continuous length of chain 10 with a plurality of hooks 11 secured thereto at spaced apart intervals. The chain is placed around the tread of the wheel rim 12, here shown as having a cylindrical tread with smooth edges, in a zigzag arrangement, one hook 11 being engaged over the edge of the rim on one side and the next hook engaged over the opposite edge. The hooks are spaced apart one from the other along the chain a distance greater than the rim width so that as the chain is applied to the rim, it is pulled diagonally thereacross between the hooks.

The chain 10 has a length for the particular rim size to have the two ends approach one another at one side of the rim, and hooks 13 and 14 are secured to the respective ends to engage over the same rim edge in relative close proximity one to the other. The hook 13 has one end of a rack bar 15 pivoted thereto and this bar is slipped by its free end over the plate 16 of the hook 14 under the tongue 17 which is secured to and spaced from the plate.

On the plate 16 is pivoted a pinion gear 18, one side of which has the teeth removed to present a flat surface $a$. The pivot point of this gear 18 is so located on the plate 16, that the gear must be revolved to bring the flat side around toward and against the toothed edge of the rack bar 15 as it is slid across the plate 16. The gear by its flat side $a$ guides the bar 15 on the toothed side and the end of the tongue 17 where it joins the plate 16 serves as the guide on the back edge of the bar 15.

The bar 15 is pulled across the plate 16 as far as possible by hand to pull the chain 10 snugly against the rim 12 to take out all possible slack. The gear 18 is provided with a handle 19, then in the position as indicated by the dash lines, Fig. 3, when the side $a$ is toward the bar teeth. When the bar 15 has been pulled up as far as possible, the handle is swung around to cause the teeth of the gear 18 to mesh with the teeth of the bar 15 and thereby cause the bar 15 to move therepast.

The handle is swung around until it is approximately parallel to the bar 15 to bring the outer end over the plate 20 of the hook 13 and under the lip 21. A cap screw 22 is passed through the lip on the outside of the handle 19 and screw-threadedly engaged in the plate 20 as a means of holding the handle so as to maintain the chain under the great tension secured through the leverage of the handle and gear in pulling the chain ends toward each other.

Removing the chain is accomplished by taking out the screw 22 and allowing the handle 19 to return to have the flat side a of the gear 18 toward the rack bar 15, whereupon the bar may be slipped out and permit the hooks 13 and 14 to be disengaged from the rim edge, after which, the hooks 11 one by one may be disengaged from the rim edges. The size of the chain links may be varied as desired to meet varying soil conditions. Since the chain zigzags across the face of the rim, the distance between the rim face and the ground is uniformly the height of the chain links at all times. The links serve very effectively in biting into the surface travelled over whether it be ice, snow, mud, or the ordinary surface soil, to prevent slippage of the wheel rim under hard pulls.

It is to be noted that the chain 10 is to be pulled back and forth across the face of the rim 12 between the hooks 11 under tension so that when the chain ends are pulled toward each other, the chain becomes wedged on the rim so tightly as to prevent its slipping therearound. By simply varying the chain length, the same structure is adapted to fit a wide range of wheel rims.

While we have here shown and described our invention in the one best form as now known to us, it is obvious that structural variations may be utilized without departing from the spirit of the invention, and we, therefore, do not desire to be limited to that form, nor any more than may be required by the following claim.

We claim:

For a wheel having a demountable traction attachment comprising a chain adapted to be laid about the rim of the wheel, said chain having a plurality of hooks secured to and spaced apart along the chain and adapted to engage over the rim edges, and said chain having terminal hooks in the ends of the chain, said chain having a length to have the terminal hooks engage over the same rim edge and the terminal hooks being in relatively close proximity, a rack bar fixed to one of said terminal hooks, a lip also fixed to that hook, a cap screw through the lip, a gear revolubly mounted on the other terminal hook, said gear having a flat side adapted to permit said bar to be carried past said gear across the said other hook without revolving the gear, and a handle to revolve the gear to cause it to mesh with said rack bar to draw it across said other hook, said handle adapted to be held by the lip and cap screw to retain the rack bar in its drawn position.

In testimony whereof we affix our signatures.

LESLIE E. CADWELL.
EARL E. ISENHOWER.